(12) United States Patent
Zaccarin et al.

(10) Patent No.: US 7,336,709 B2
(45) Date of Patent: Feb. 26, 2008

(54) METHOD AND APPARATUS FOR MULTI-RATE ENCODING OF VIDEO SEQUENCES

(75) Inventors: André Zaccarin, Sunnyvale, CA (US); Boon-Lock Yeo, Sunnyvale, CA (US)

(73) Assignee: Intel Corporation, Santa Clara, CA (US)

( * ) Notice: Subject to any disclaimer, the term of this patent is extended or adjusted under 35 U.S.C. 154(b) by 818 days.

(21) Appl. No.: 10/627,505

(22) Filed: Jul. 24, 2003

(65) Prior Publication Data
US 2005/0190842 A1    Sep. 1, 2005

Related U.S. Application Data

(63) Continuation of application No. 09/863,682, filed on May 22, 2001, now Pat. No. 6,778,607.

(51) Int. Cl.
H04N 7/12    (2006.01)
(52) U.S. Cl. .................................. 375/240.16
(58) Field of Classification Search ............... 348/414, 348/417, 418, 400, 401, 422; 375/240.16, 375/240.18, 240.2, 240.03, 240.27, 240.14, 375/240.12, 224, 249
See application file for complete search history.

(56) References Cited

U.S. PATENT DOCUMENTS

| | | | | |
|---|---|---|---|---|
| 5,457,495 A | * | 10/1995 | Hartung | ............... 375/240.14 |
| 5,933,451 A | * | 8/1999 | Ozkan et al. | ............... 375/224 |
| 6,181,711 B1 | | 1/2001 | Zhang et al. | |
| 6,233,283 B1 | * | 5/2001 | Chiu et al. | ............. 375/240.27 |
| 2002/0152317 A1 | * | 10/2002 | Wang et al. | ................ 709/231 |
| 2002/0159457 A1 | * | 10/2002 | Zhang et al. | ............... 370/391 |

OTHER PUBLICATIONS

Koc, Ut-Va and Liu, K.J. Ray, "DCT-Based Motion Estimation," IEEE Transactions on Image Processing, vol. 7, No. 7, Jul. 1998, pp. 948-965.

Song, Junehwa and Yeo, Boon-Lock, "A Fast Algorithm for DCT-Domain Inverse Motion Compensation Based on Shared Information in a Macroblock," IEEE Transactions on Circuits and Systems for Video Technology, vol. 10, No. 5, Aug. 2000, pp. 767-775.

Koc, Ut-Va and Liu, K.J. Ray, "Interpolation-Free Subpixel Motion Estimation Techniques in DCT Domain," IEEE Transactions on Circuits and Systems for Video Technology, vol. 8, No. 4, Aug. 1998, pp. 460-487.

Assuncao, Pedro A.A. and Ghanbari, Mohammed, "A Frequency-Domain Video Transcoder for Dynamic Bit-Rate Reduction of MPEG-2 Bit Streams," IEEE Transactions on Circuits and Systems for Video Technology, vol. 8, No. 8, Dec. 1998, pp. 953-967.

* cited by examiner

*Primary Examiner*—Tong Vo
*Assistant Examiner*—Behrooz Senfi
(74) *Attorney, Agent, or Firm*—Blakely, Sokoloff, Taylor & Zafman LLP

(57) ABSTRACT

A method and apparatus for multi-rate encoding of video sequences. The input data stream is received at a first bit rate. A domain transformation is performed on the input data and the transformed data is encoded into a series of output data streams each with a different bit rate.

9 Claims, 8 Drawing Sheets

METHOD AND APPARATUS FOR MULTI-RATE ENCODING OF VIDEO SEQUENCES

This application is a continuation of application Ser. No. 09/863,682, entitled "METHOD AND APPARATUS FOR MULTI-RATE ENCODING OF VIDEO SEQUENCES," filed May 22, 2001 now U.S. Pat. No. 6,778,607 and assigned to the corporate assignee of the present invention.

FIELD OF THE INVENTION

The present invention pertains to the encoding of information. More particularly, the present invention relates to a method and apparatus for multi-rate encoding of video sequences.

BACKGROUND OF THE INVENTION

Different communications media have different bandwidth capability. A signal needing to be sent may exceed the bandwidth of a particular medium. One method to reduce the bandwidth is to encode the signal. However, the signal may need to be sent through various media having different bandwidth capability. Thus, encoding the signal at a single bit rate may pose problems. For example, encoding a video sequence to have the highest quality for a given digital subscriber line (xDSL), may have too high a bit rate for transmission through a 56K modem line.

Numerous approaches to doing multi-rate encoding have been tried. One obvious approach is to encode the data, such as a video sequence, at multiple different bit rates by using an encoder and running the video sequence through the encoder as many times as there are bit streams to generate, each time adjusting the encoder parameters so that the output data has the proper bit rate and/or quality level. Another obvious, brute force approach, is to have a group of encoders in parallel, each running at different bit rates as is required.

BRIEF DESCRIPTION OF THE DRAWINGS

The present invention is illustrated by way of example and not limitation in the figures of the accompanying drawings, in which like references indicate similar elements and in which.

DETAILED DESCRIPTION

Figure 1:
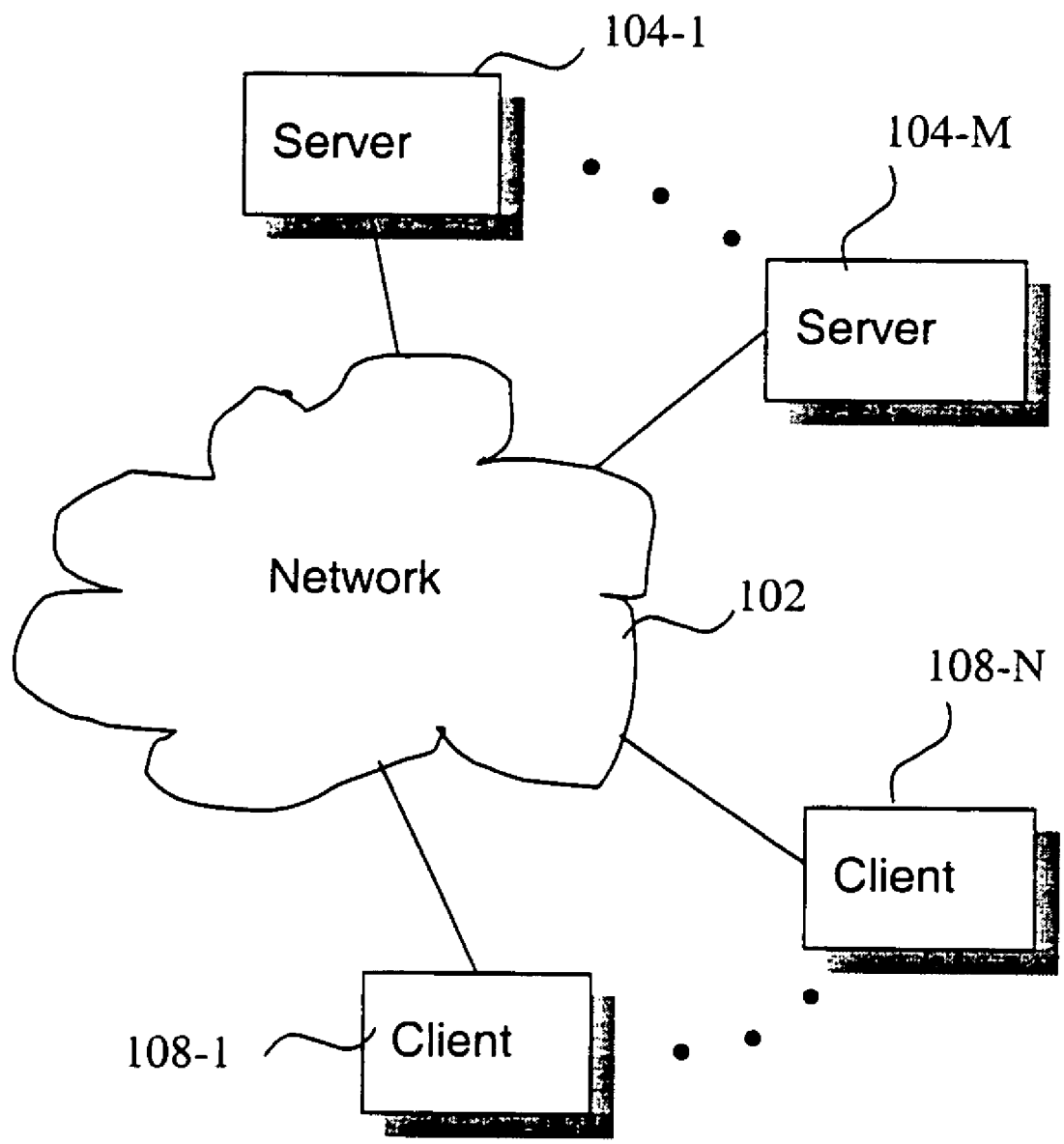
FIG. 1 illustrates a networked computer environment.

A method and apparatus for multi-rate encoding of information are described.

For purposes of discussing the invention, it is to be understood that various terms are used by those knowledgeable in the art to describe techniques and approaches.

In the following description, for purposes of explanation, numerous specific details are set forth in order to provide a thorough understanding of the present invention. It will be evident, however, to one skilled in the art that the present invention may be practiced without these specific details. In some instances, well-known structures and devices are shown in block diagram form, rather than in detail, in order to avoid obscuring the present invention. These embodiments are described in sufficient detail to enable those skilled in the art to practice the invention, and it is to be understood that other embodiments may be utilized and that logical, mechanical, electrical, and other changes may be made without departing from the scope of the present invention.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of acts leading to a desired result. The acts are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention can be implemented by an apparatus for performing the operations herein. This apparatus may be specially constructed for the required purposes, or it may comprise a general-purpose computer, selectively activated or reconfigured by a computer program stored in the computer. Such a computer program may be stored in a computer readable storage medium, such as, but not limited to, any type of disk including floppy disks, optical disks, compact disk- read only memories (CD-ROMs), and magnetic-optical disks, read-only memories (ROMs), random access memories (RAMs), electrically programmable read-only memories (EPROM)s, electrically erasable programmable read-only memories (EEPROMs), magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method. For example, any of the methods according to the present invention can be implemented in hard-wired circuitry, by programming a general-purpose processor or by any combination of hardware and software. One of skill in the art will immediately appreciate that the invention can be practiced with computer system configurations other than those described below, including hand-held devices, multiprocessor systems, microprocessor-based or programmable consumer electronics, digital signal processing (DSP) devices, network PCs, minicomputers, mainframe computers, and the like. The invention can also be practiced in distributed computing environments where tasks are performed by remote processing devices that are linked through a communications network. The required structure for a variety of these systems will appear from the description below.

The methods of the invention may be implemented using computer software. If written in a programming language conforming to a recognized standard, sequences of instructions designed to implement the methods can be compiled for execution on a variety of hardware platforms and for interface to a variety of operating systems. In addition, the present invention is not described with reference to any particular programming language. It will be appreciated that a variety of programming languages may be used to implement the teachings of the invention as described herein. Furthermore, it is common in the art to speak of software, in one form or another (e.g., program, procedure, application . . . ), as taking an action or causing a result. Such expressions are merely a shorthand way of saying that execution of the software by a computer causes the processor of the computer to perform an action or produce a result.

It is to be understood that various terms and techniques are used by those knowledgeable in the art to describe communications, protocols, applications, implementations, mechanisms, etc. One such technique is the description of an implementation of a technique in terms of an algorithm or mathematical expression. That is, while the technique may be, for example, implemented as executing code on a computer, the expression of that technique may be more aptly and succinctly conveyed and communicated as a formula, algorithm, or mathematical expression. Thus, one skilled in the art would recognize a block denoting A+B=C as an additive function whose implementation in hardware and/or software would take two inputs (A and B) and produce a summation output (C). Thus, the use of formula, algorithm, or mathematical expression as descriptions is to be understood as having a physical embodiment in at least hardware and/or software (such as a computer system in which the techniques of the present invention may be practiced as well as implemented as an embodiment).

A machine-readable medium is understood to include any mechanism for storing or transmitting information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

FIG. 1 illustrates a network environment in which the techniques described may be applied. As shown, several computer systems in the form of M servers 104-1 through 104-M and N clients 108-1 through 108-N are connected to each other via a network, which may be, for example, the Internet. Note that alternatively the network 102 might be or include one or more of: a Local Area Network (LAN), Wide Area Network (WAN), satellite link, fiber network, cable network, or a combination of these and/or others. The method and apparatus described herein may be applied to essentially any type of communicating means or device whether local or remote, such as a LAN, a WAN, a system bus, a disk drive, storage, etc.

Figure 2:
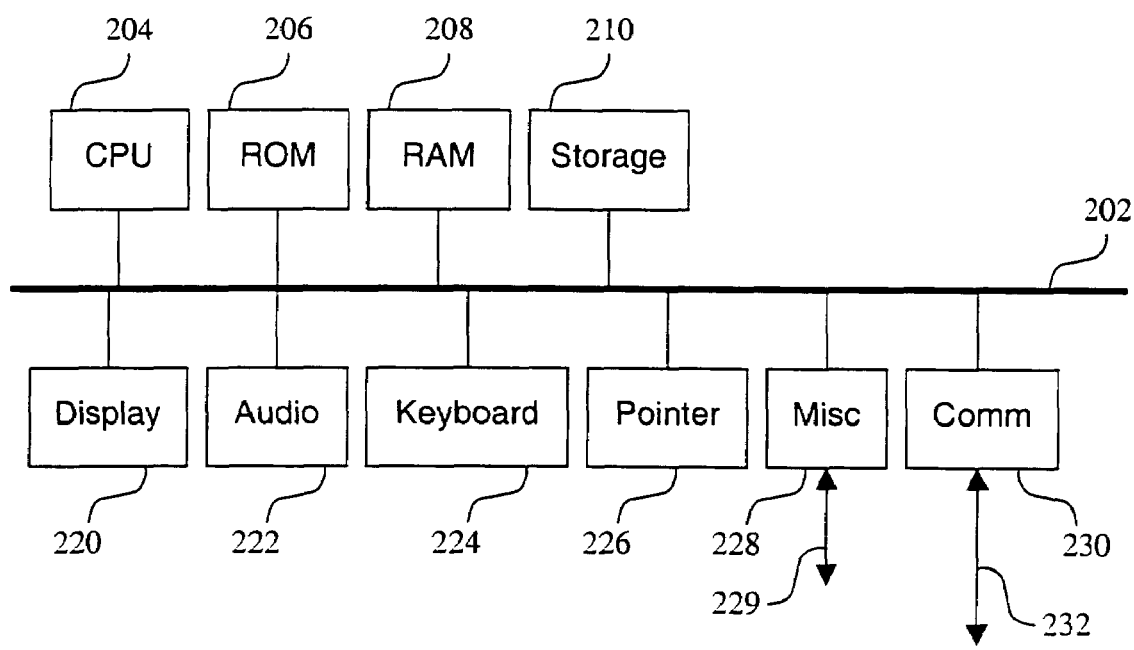
FIG. 2 is a block diagram of a computer system.

FIG. 2 illustrates a conventional personal computer in block diagram form, which may be representative of any of the clients and servers shown in FIG. 1. The block diagram is a high level conceptual representation and may be implemented in a variety of ways and by various architectures. Bus system 202 interconnects a Central Processing Unit (CPU) 204, Read Only Memory (ROM) 206, Random Access Memory (RAM) 208, storage 210, display 220, audio, 222, keyboard 224, pointer 226, miscellaneous input/output (I/O) devices 228, and communications 230. The bus system 202 may be for example, one or more of such buses as a system bus, Peripheral Component Interconnect (PCI), Advanced Graphics Port (AGP), Small Computer System Interface (SCSI), Institute of Electrical and Electronics Engineers (IEEE) standard number 1394 (FireWire), etc. The CPU 204 may be a single, multiple, or even a distributed computing resource. The ROM 206 may be any type of non-volatile memory, which may be programmable such as, mask programmable, flash, etc. RAM 208 may be, for example, static, dynamic, synchronous, asynchronous, or any combination. Storage 210, may be Compact Disc (CD), Digital Versatile Disk (DVD), hard disks (HD), optical disks, tape, flash, memory sticks, video recorders, etc. Display 220 might be, for example, a Cathode Ray Tube (CRT), Liquid Crystal Display (LCD), a projection system, Television (TV), etc. Audio 222 may be a monophonic, stereo, three dimensional sound card, etc. The keyboard 224 may be a keyboard, a musical keyboard, a keypad, a series of switches, etc. The pointer 226, may be, for example, a mouse, a touchpad, a trackball, joystick, etc. I/O devices 228, might be a voice command input device, a thumbprint input device, a smart card slot, a Personal Computer Card (PC Card) interface, virtual reality accessories, etc., which may optionally connect via an input/output port 229 to other devices or systems. An example of a miscellaneous I/O device 228 would be a Musical Instrument Digital Interface (MIDI) card with the I/O port 229 connecting to the musical instrument(s). Communications device 230 might be, for example, an Ethernet adapter for local area network (LAN) connections, a satellite connection, a settop box adapter, a Digital Subscriber Line (xDSL) adapter, a wireless modem, a conventional telephone modem, a direct telephone connection, a Hybrid-Fiber Coax (HFC) connection, cable modem, etc. The external connection port 232 may provide for any interconnection, as needed, between a remote device and the bus system 202 through the communications device 230. For example, the communications device 230 might be an Ethernet adapter, which is connected via the connection port 232 to, for example, an external DSL modem. Note that depending upon the actual implementation of a computer system, the computer system may include some, all, more, or a rearrangement of components in the block diagram. For example, a thin client might consist of a wireless hand held device that lacks, for example, a traditional keyboard. Thus, many variations on the system of FIG. 2 are possible.

Referring back to FIG. 1, clients 108-1 through 108-N are effectively connected to web sites, application service providers, search engines, and/or database resources represented by servers, such as servers 104-1 through 104-M, via the network 102. The web browser and/or other applications are generally running on the clients 108-1 through 108-N, while information generally resides on the servers 104-1 through 104-M. For ease of explanation, a single client 108-1 will be considered to illustrate one embodiment of the present techniques. It will be readily apparent that such techniques can be easily applied to multiple clients.

A subsystem may be, but is not limited to, one or more of the elements of FIG. 2. For example, Storage 210 may have a subsystem that handles how data is to be stored and retrieved. Audio 222 may have a subsystem that handles when to, for example, power down speakers. Communications device 230 may, for example, have a subsystem that needs to transfer information to the Storage 210 without using the main operating system upon receiving a message.

Clients 108-1 through 108-N may be connected to receive information from either a single server, such as, 104-1, and/or a series of servers, such as 104-1 through 104-M. Because of the variety of connection possibilities, each connection may have a different bandwidth. Under such a circumstance, it is advisable to match the transmission bit rate to the bandwidth so as not to overload or delay transmission of information. Thus, encoding of the information at different bit rates is beneficial. In the case of real-time transmissions, such as video, the matching of encoding bit rate to channel bandwidth will allow for the highest quality real-time display of the video information without gaps, pauses, or freezes. A multi-rate encoder may be located at the servers (104-1 through 104-M) and/or as part of the network 102 serving clients (108-1 through 108-N). Additionally, the originating source of the information may do the multi-rate encoding and simply make it available to, for example, servers (104-1 through 104-M). What is to be appreciated is multi-rate encoding may provide for clients having a very high bandwidth, such as a DSL, to a very small bandwidth client such as a wireless link for a pager.

Figure 3:
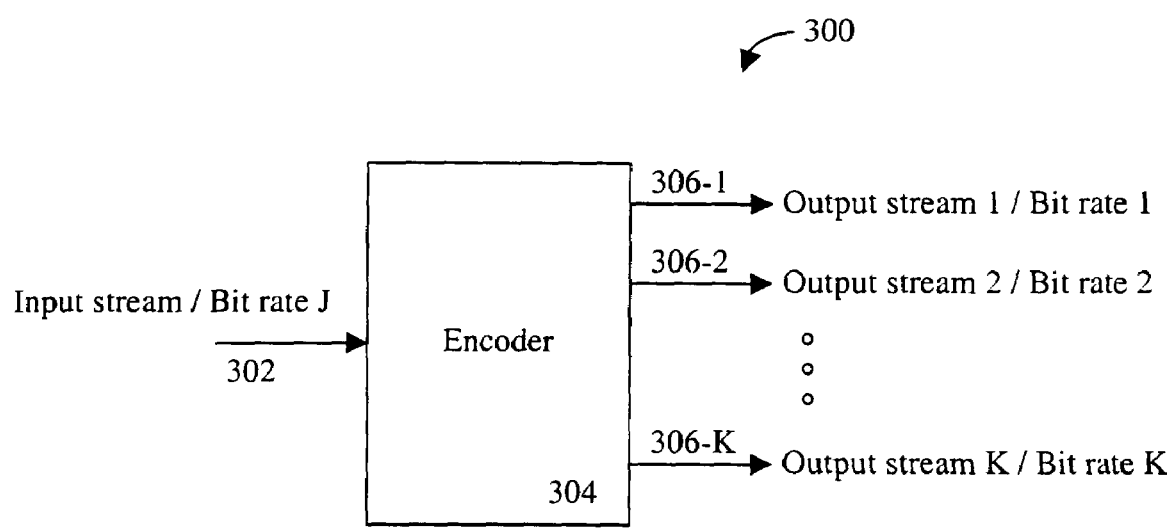
FIG. 3 illustrates in block diagram form one embodiment of a multi-rate encoder.

FIG. 3 illustrates in block diagram form one embodiment of a multi-rate encoder 300. The input stream of data at bit rate J 302 enters the encoder 304, and produces a variety of output streams at various output bit rates (306-1 through 306-K).

Figure 4:
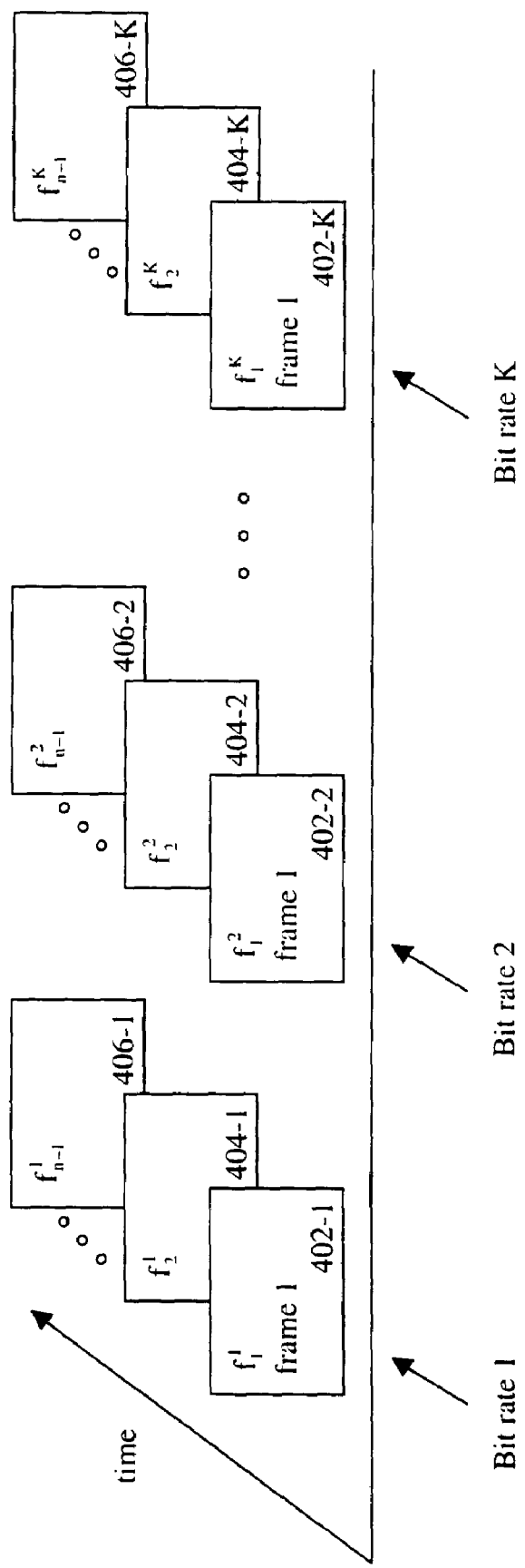
FIG. 4 illustrates a time sequence for one embodiment of a multi-rate encoder.

FIG. 4 illustrates a time sequence for one embodiment of a multi-rate encoder. Notationally, $f_n^k$ represents a frame (f) where the subscript n refers to the frame number and the superscript k refers to a bit rate. In this embodiment, a given frame is encoded for each of the respective bit rates before the next frame is encoded. For example, frame 1 ($f_1^1$) 402-1 is encoded with a bit rate 1 before frame 2, $f_2^1$ 404-1 is encoded. Also, frame 1 for all the bit rates (1, 2, . . . K) $f_1^1$ 402-1, $f_1^2$ 402-2, . . . $f_1^k$ 402-K, are encoded before the next respective frame for a given bit rate. Thus, $f_1^1$ at 402-1, $f_1^2$ 402-2, and $f_1^k$ 402-K, may all be encoded before $f_2^1$ at 404-1, $f_2^2$ 404-2, and $f_2^k$ 404-K.

Thus an embodiment of the invention may encode a video sequence $\{f_n\}$ in K independent streams at K different bit rates and/or video quality simultaneously. The process by which this is accomplished will be described by assuming that the first n−1 frames, $f_1, f_2, \ldots, f_{n-1}$, have been encoded. Simultaneous encoding as used in this description means that the encoding process for the $n^{th}$ frame of all K streams is completed before the encoding process for the $(n+1)^{th}$ frame is started for any of the encoded streams.

Figure 5:
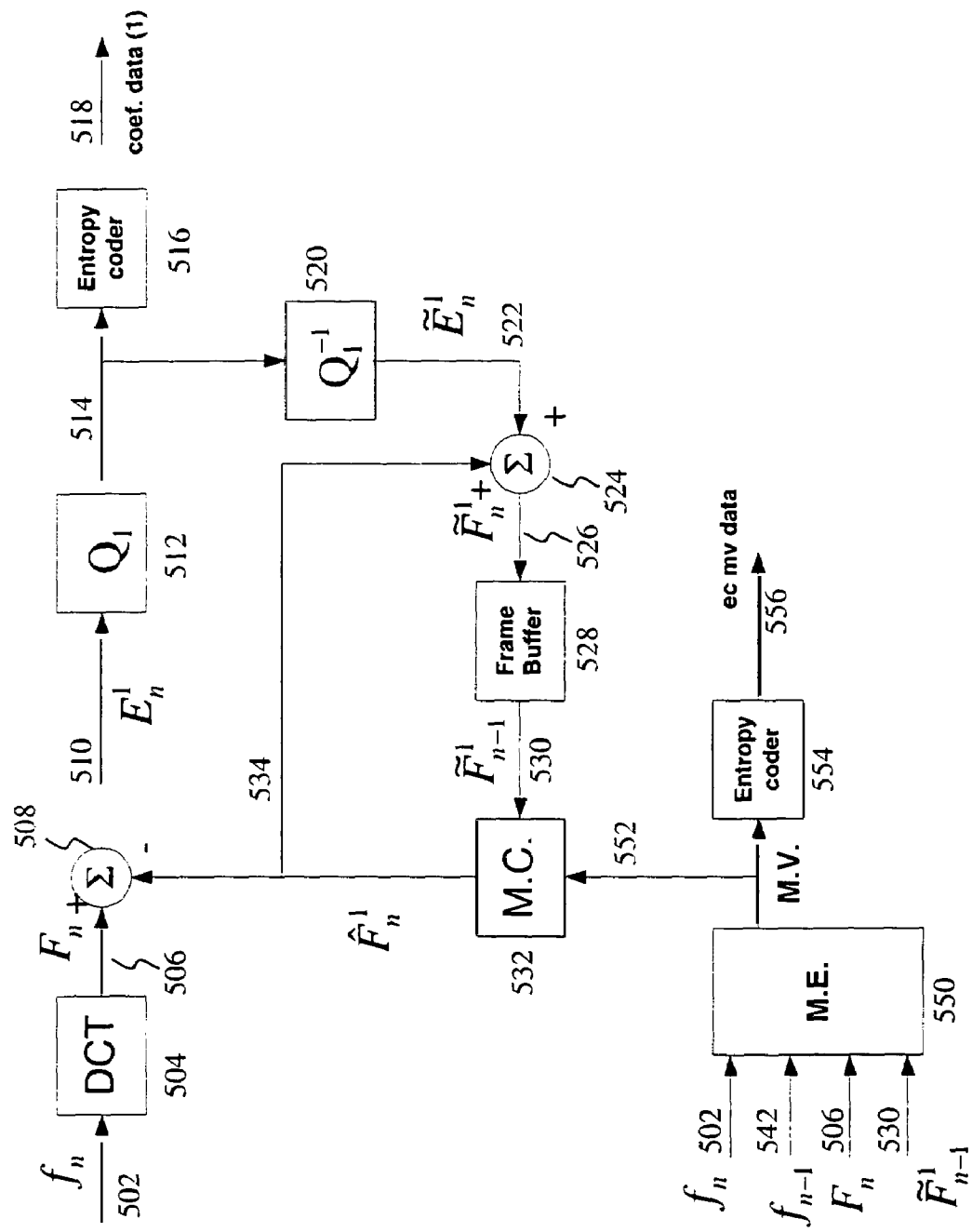
FIG. 5 illustrates one embodiment for an encoder for the first stream.

FIG. 5 illustrates one embodiment for an encoder for the first stream. Encoding of the $n^{th}$ frame of the sequence, $f_n$ 502, starts with the computation of its representation in a transformed space. Let $F_n$ 506 represent the transformed frame. For MPEG encoding, this transform is the discrete cosine transform, DCT 504, performed on blocks of 8×8 pixels. This operation is performed only once on frame $f_n$ 502.

From this transformed frame $F_n$ 506, we then subtract 508 its predicted transformed representation, $\hat{F}_n^1$ 534 (also referred to as transformed predicted data). The index 1 refers here to the data associated with the encoding of the first stream. The difference between $F_n$ 506 and $\hat{F}_n^1$ 534, $E_n^1$ 510, is then quantized, using the quantizer ($Q_1$ 512) associated with the first stream. The quantizer's output 514, which consists in quantization levels, is then encoded without loss (Entropy coder 516) to generate the data noted as (coefficient data) coef. data (1) 518. In the feedback loop of the encoder, the quantization levels representing $E_n^1$ 510 are then mapped to their respective values ($Q_1^{-1}$ 520) to generate $\tilde{E}_n^1$ 522, the quantized representation of $E_n^1$ 510. $\hat{F}_n^1$ 534 is then added (524) to $\tilde{E}_n^1$ 522 to form $\tilde{F}_n^1$ 526, the transformed representation of the reconstructed $n^{th}$ frame of the first stream. $\tilde{F}_n^1$ 526 is then stored in a frame buffer 528.

The computation of the predicted transformed representation of frame $\hat{F}_n^1$ 532 can be done without any other frame information (like for intra picture (I) frames in Motion Pictures Experts Group (MPEG)), or by using motion information relating frame $f_n$ to one or many frames previously encoded. These frames can be temporally anterior and/or posterior to frame $f_n$. For simplicity, FIG. 5 illustrates only the case when the immediately previously reconstructed frame is used. More specifically, in FIG. 5, $\tilde{F}_{n-1}^1$ 530 is motion compensated (M.C. 532) to generate $\hat{F}_n^1$ 534, the transformed predicted representation of $f_n$. Note that the motion compensation is performed in the transformed domain.

The motion information may be computed (motion estimation M.E. 550) using all or some of the following frames: $f_n$ 502, $f_{n-1}$ 542, $F_n$ 506, $\tilde{F}_{n-1}^1$ 530, and $\tilde{f}_{n-1}$ (obtained from an inverse discrete cosine transform, IDCT of $\tilde{F}_{n-1}^1$ 530). These frames are the current and previously reconstructed frame both in the spatial and transformed domain, as well as the preceding original frame. For example, one could compute motion information with pixel precision using $f_n$ and $f_{n-1}$, and refine that motion information to ½ pixel accuracy using the transformed frames $F_n$ and $\tilde{F}_{n-1}^1$. From the motion estimation 550 is output motion vector data (M.V. 552) which is used by the motion compensation 532 block and an Entropy coder 554 to generate entropy coded motion vector data (ec mv data) 556.

Figure 6:
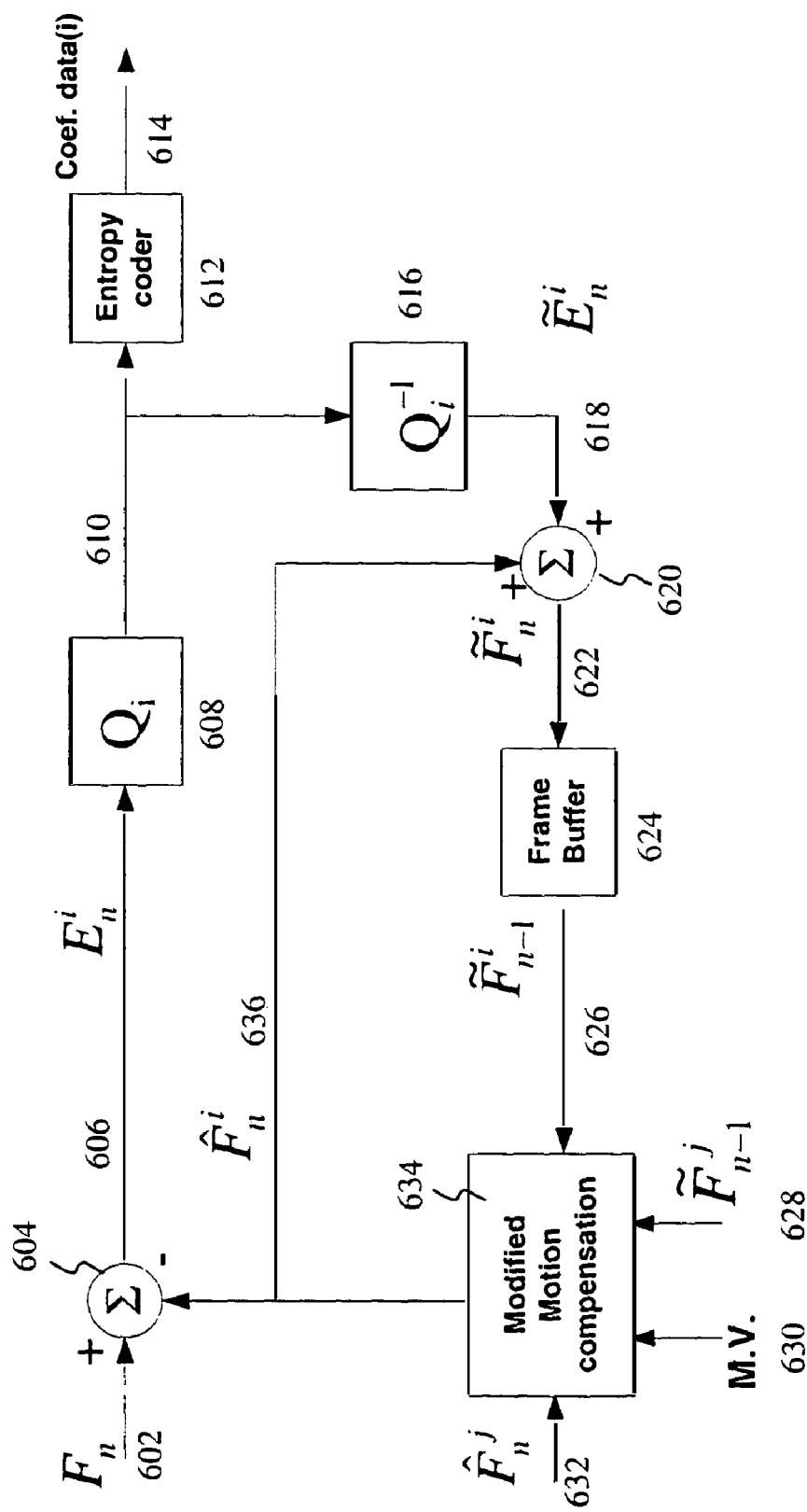
FIG. 6 illustrates one embodiment for an encoder for subsequent streams.

FIG. 6 illustrates one embodiment for an encoder for subsequent streams. The encoding of $f_n$ 502 at other rates or quality levels reuses data that was obtained when generating the previous streams. The index i refers here to the data associated with the encoding of the $i^{th}$ stream.

As with the generation of stream 1, the predicted frame $\hat{F}_n^i$ 636 is subtracted 604 from $F_n$ 602. The difference, $E_n^i$ 606, is then quantized ($Q_i$ 608) and the value of the quantization levels 610 are encoded (Entropy coder 612) without loss to generate coef. data (i) 614. The reconstructed frame (from $Q_i^{-1}$ 616) $\tilde{E}_n^i$ 618 is then added 620 to $\hat{F}_n^i$ 636 to generate the $n^{th}$ reconstructed frame of stream i, $\tilde{F}_n^i$ 622.

Figure 7:
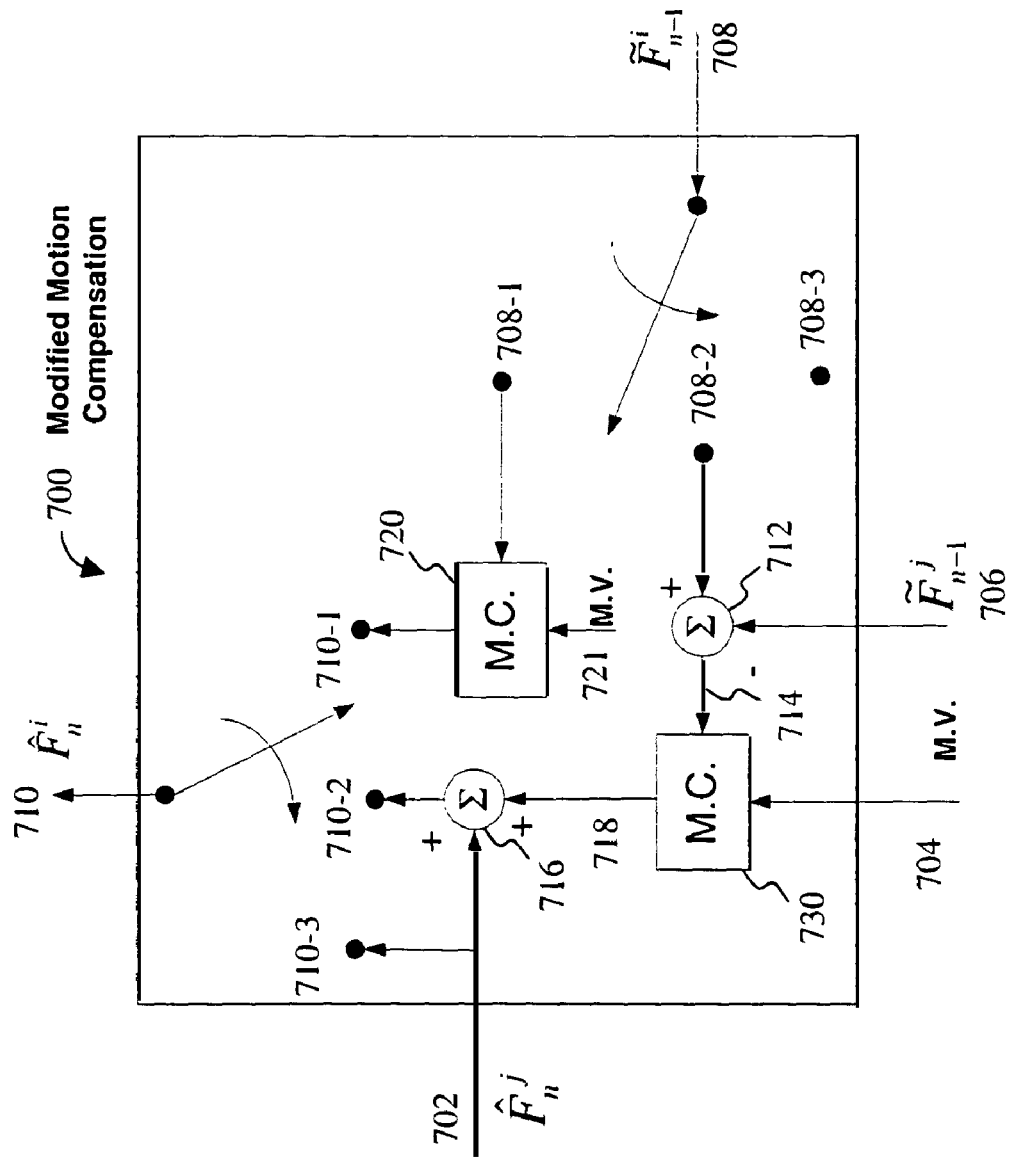
FIG. 7 illustrates one embodiment for motion compensation.

The computation of the predicted frame $\hat{F}_n^i$ 636 may differ from that of frame $\hat{F}_n^1$ 534 as shown in FIGS. 6 and 7. For example, in this embodiment, FIG. 7 shows that the predicted frame $\hat{F}_n^i$ 710 can be generated in three different ways. Note that the sub-system used to generate $\hat{F}_n^i$ 634, 700 can be changed within the same frame on a block basis. The first sub-system used the predicted frame from a previous stream, i.e., $\hat{F}_n^j$ 632, 702, for example, the previous stage (j=i−1). In the second sub-system, motion information, previously computed for stream 1 (j=i−1), is used for the motion compensation of the difference of frames $\tilde{F}_{n-1}^i$ 626, 708, and $\tilde{F}_{n-1}^j$ 628, 706, to which $\hat{F}_n^j$ 702 is then added.

Finally, the third sub-system is like what is done for stream 1, i.e. frame $\tilde{F}_{n-1}^{i}$ 626, 708 is motion compensated.

For the last two sub-systems described above, one may implement the motion compensation so that not all transformed coefficients are used. Although this may introduce a mismatch error with the decoder, it may be used to speed up the motion compensation.

Additionally, it is to be understood that while the above example, for simplicity, used the directly previously encoded stage, i.e. j=i−1, j may represent any previously encoded stage. All that is required is j<i.

Once the information describing the $n^{th}$ frame for all K streams has been computed as described above, the process starts over with the following frames: first, encoding of $f_{n+1}$ for stream 1, followed by the encoding of the same frame, $f_{n+1}$, for all other streams, and so on until the video sequence has been completed encoded.

FIG. 7 illustrates one embodiment for motion compensation. It has three different ways of doing motion compensation as was mentioned above. First, when $\tilde{F}_{n-1}^{i}$ 708 is connected to 708-1 and $\hat{F}_{n}^{i}$ 710 is connected to 710-1, then the motion compensation (M.C.) 720 is derived from the inputs 721 the motion vector data (M.V.) and $\tilde{F}_{n-1}^{i}$ 708, while $\hat{F}_{n}^{j}$ 702 is not utilized.

When $\tilde{F}_{n-1}^{i}$ 708 is connected to 708-2 and $\hat{F}_{n}^{i}$ 710 is connected to 710-2, then the output $\hat{F}_{n}^{i}$ 710 is derived from the input $\hat{F}_{n}^{j}$ 702 summed 716 with the output 718 of the motion compensation block (M.C.) 730 having the inputs of the motion vector data (M.V.) 704 and the output 714, from the difference 712 between the inputs $\tilde{F}_{n-1}^{j}$ 706 and $\tilde{F}_{n-1}^{i}$ 708.

Finally, if $\tilde{F}_{n-1}^{i}$ 708 is connected to 708-3 and $\tilde{F}_{n-1}^{i}$ 710 is connected to 710-3, then the output $\hat{F}_{n}^{i}$ 710 is derived solely from the input $\hat{F}_{n}^{j}$ 702.

Figure 8:
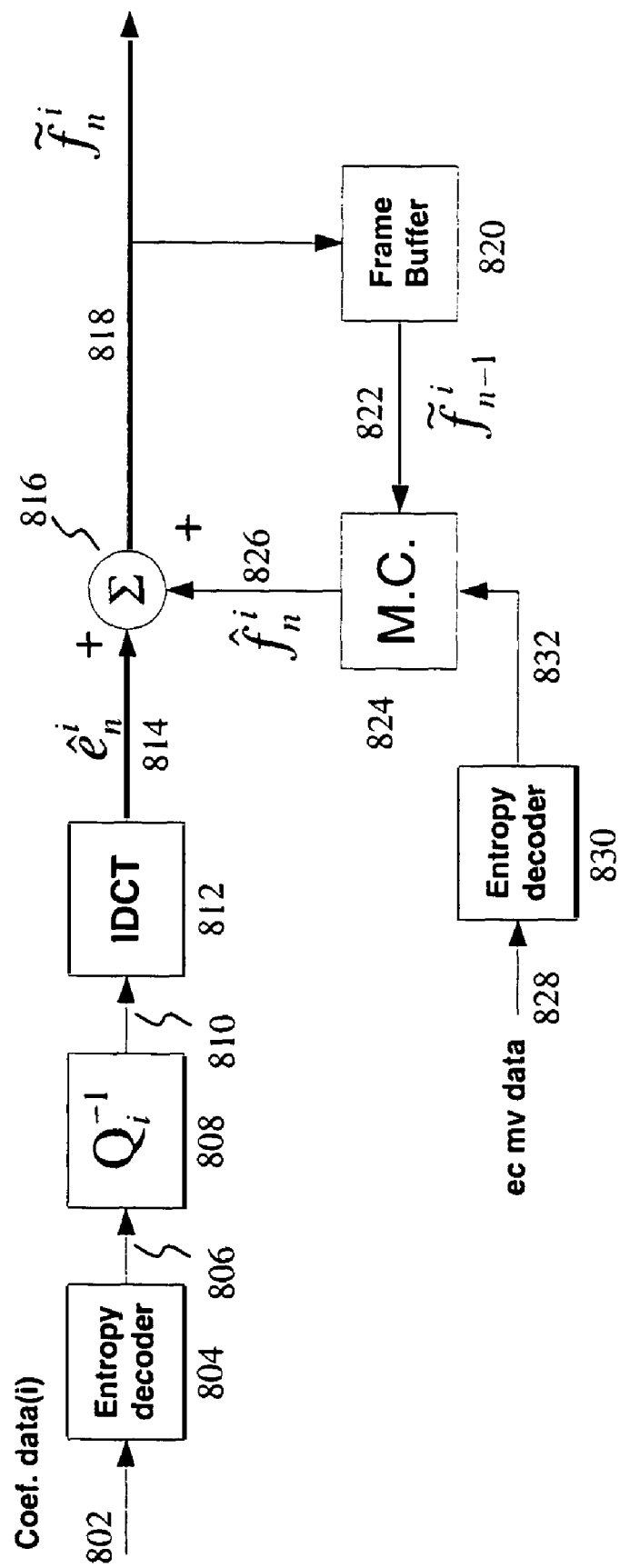
FIG. 8 illustrates a prior art decoder for streams.

FIG. 8 illustrates a prior art decoder for streams and is provided for completeness in understanding how the signals encoded in the present invention may be decoded. Input coefficient data 802 (Coef. data(i)) enters an Entropy decoder 804 and the output 806 then generates a reconstructed frame 810 (from $Q_i^{-1}$ 808). From here the signal 810 goes through an inverse DCT (IDCT 812) and the output is $\hat{e}_n^{i}$ 814. The output 814 is then summed 816 with $\tilde{f}_n^{i}$ 826 to produce the output $\tilde{f}_n^{i}$ 818. $\tilde{f}_n^{i}$ 826 is produced by the motion compensation block (M.C.) 824 which has as inputs $\tilde{f}_{n-1}^{i}$ 822 coming from Frame Buffer 820, and 832 from the Entropy decoder 830 whose input is the entropy coded motion vector data (ec mv data) 828.

In the above embodiments, functional blocks denoting well known operations, such as the discrete cosine transform, quantization, de-quantization, summation, difference, entropy coding, frame buffer, motion estimation, etc. have not been detailed in order to not obscure the description. It is to be understood however, that these functions are well known in the art and may be implemented in hardware and/or software, either on general purpose and/or dedicated computers or microcomputers. For example, frame buffer 528, which functions as a time delay element, may be performed on a computer running software by storing the data and some time later retrieving it, or in hardware by using a standard hardware based frame buffer.

It is to be appreciated that the architecture and functionality described above may have other embodiments. For example, in FIG. 5 the transform block 504 is the discrete cosine transform. Other embodiments may use other transforms and/or functions, and their inverses, alone or in combinations, such as, wavelet, edgelet, Fourier, Walsh, Hadamard, Hartley, Haar, sine, cosine, hyperbolic, convolution, correlation, autocorrelation, modulation, decimation, interpolation, etc. as may be beneficial based upon the input signal characteristics.

Additionally, it is to be appreciated that the present invention may code each of the K independent streams at K different bit rates as either a constant bit rate (CBR) and/or variable bit rate (VBR) to achieve the system goal of bit rate and/or video quality. Likewise, the quantizer and de-dequantizer referred to may be of either a fixed and/or variable resolution. This resolution may be in response to CBR and/or VBR requirements.

Finally, one is to appreciate that as previously mentioned, the present invention places no temporal restrictions on the input data. Thus, temporally anterior and/or posterior encoding may be performed.

Thus, a method and apparatus method and apparatus for multi-rate encoding of video sequences have been described. Although the present invention has been described with reference to specific exemplary embodiments, it will be evident that various modifications and changes may be made to these embodiments without departing from the broader spirit and scope of the invention as set forth in the claims. Accordingly, the specification and drawings are to be regarded in an illustrative rather than a restrictive sense.

What is claimed is:

1. An apparatus for generating a plurality of multi-rate encoded video streams comprising:

a domain transform stage, having a signal input and a transform output, wherein the signal input is coupled to receive an input stream of video frames;

a motion estimation stage, having a first input, a second input, a third input, a fourth input, and an output, wherein the first input is coupled to receive the input stream, the second input is coupled to receive a prior video frame, the third input is coupled to receive the transform output, the fourth input is coupled to receive a prior transformed video frame, and the output is motion vector data;

a first encoder stage, having a first input, a second input, a first output, and a second output, wherein the first input is coupled to receive the transform output, the second input is coupled to receive the motion vector data, the first output is first coefficient data, and the second output is a delayed first encoder stage signal; and a plurality of subsequently cascaded encoder stages each having a first input, a second input, a third input, a first output, and a second output, wherein the first input is coupled to receive the transform output, the second input is coupled to receive the motion vector data, the third input is coupled to receive a prior encoder stage delayed signal, the first output is coefficient data for that stage, and the second output is a delayed encoder signal for that stage.

2. The apparatus of claim 1 wherein the encoded video streams are generated frame by frame.

3. The apparatus of claim 1 wherein the transform stage further comprises: a discrete cosine transform.

4. The apparatus of claim 1 wherein the motion estimation stage further comprises:

an entropy coder with an input and an output, wherein the input is coupled to receive the motion vector data, and the output is entropy coded motion vector data.

5. The apparatus of claim 4 wherein the motion vector data is generated only once for each video frame.

6. An apparatus comprising:
a domain transformation block having an input and an output, the input coupled to receive an input data stream at a first bit rate, and the domain transformation block generating a transformation on the output;
a motion estimation block having a plurality of inputs and outputs, the inputs coupled to receive the input data stream at the first bit rate and the transformation, and the motion estimation block generating a motion vector and an entropy coded motion vector on the outputs; and
a plurality of bit rate encoding blocks having a plurality of inputs and outputs, the inputs coupled to receive the transformation and the motion vector, and the outputs generating entropy coded coefficient data at a plurality of bit rates.

7. The apparatus of claim 6, wherein the plurality of bit rate encoding blocks outputs further comprises predicted data and delayed compensated predicted data.

8. The apparatus of claim 7, wherein the plurality of bit rate encoding blocks inputs are further coupled to receive said predicted data and said delayed compensated predicted data.

9. The apparatus of claim 7, where the input data stream is a plurality of video frames and wherein the transformation is performed only once for each video frame.

* * * * *